United States Patent [19]

Kalmanash et al.

[11] Patent Number: 5,016,985
[45] Date of Patent: May 21, 1991

[54] INFRARED FILTER USING CHOLESTERIC LIQUIDS

[75] Inventors: Michael Kalmanash, Los Altos; Arthur L. Berman, Milpitas, both of Calif.

[73] Assignee: Kaiser Aerospace & Electronics Corporation, Oakland, Calif.

[21] Appl. No.: 210,894

[22] Filed: Jun. 24, 1988

[51] Int. Cl.$^5$ .............................................. G02F 1/133
[52] U.S. Cl. .................................... 350/335; 350/316; 350/339 F; 350/350 R; 350/352
[58] Field of Search ............... 350/352, 339 F, 350 R, 350/349, 335, 313, 316, 318; 374/162; 362/62

[56] References Cited

U.S. PATENT DOCUMENTS

| | | | |
|---|---|---|---|
| 3,679,290 | 7/1972 | Adams et al. | 350/352 |
| 3,711,181 | 1/1973 | Adams, Jr. et al. | 350/352 |
| 3,931,041 | 1/1976 | Saera et al. | 350/350 R |
| 4,155,122 | 5/1979 | Budmiger | 350/339 F |
| 4,580,196 | 4/1986 | Task | 362/62 |
| 4,618,216 | 10/1986 | Suzawra | 350/339 F |
| 4,637,895 | 1/1987 | Shannon | 374/162 |
| 4,655,553 | 4/1987 | Klein | 350/339 F |
| 4,726,660 | 2/1988 | Rushford | 350/350 R |

*Primary Examiner*—Stanley D. Miller
*Assistant Examiner*—Anita Pellman Gross
*Attorney, Agent, or Firm*—Townsend and Townsend

[57] ABSTRACT

A high precision optical filter includes a wideband filter element and a cholesteric liquid crystal notch filter element. In one embodiment, a wideband infrared filter blocks infrared wavelengths beginning at a nearly visible corner wavelength and a cholesteric liquid crystal filter blocks transmission of infrared wavelengths in a precise narrow band that includes the corner wavelength and that extends down to visible wavelengths. The liquid crystal filter may include a polymer for maintaining maximum reflectivity of the filter near the corner wavelength over an anticipated operating temperature range. The combined optical filter may be fabricated by depositing a matched pair of liquid crystal cholesteric films on a glass infrared filter element. In another embodiment, an optical filter according to the invention forms an eyepiece in a night vision goggles assembly for blocking visible light. The filter may also be mounted on a display device to block the transmission of undesirable infrared emissions at the source.

13 Claims, 4 Drawing Sheets

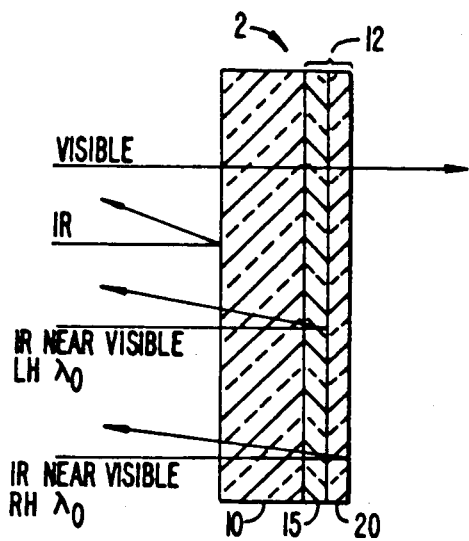
FIG._1A.
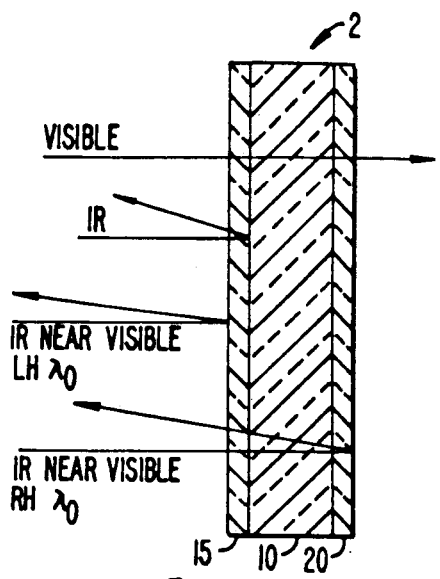
FIG._1B.
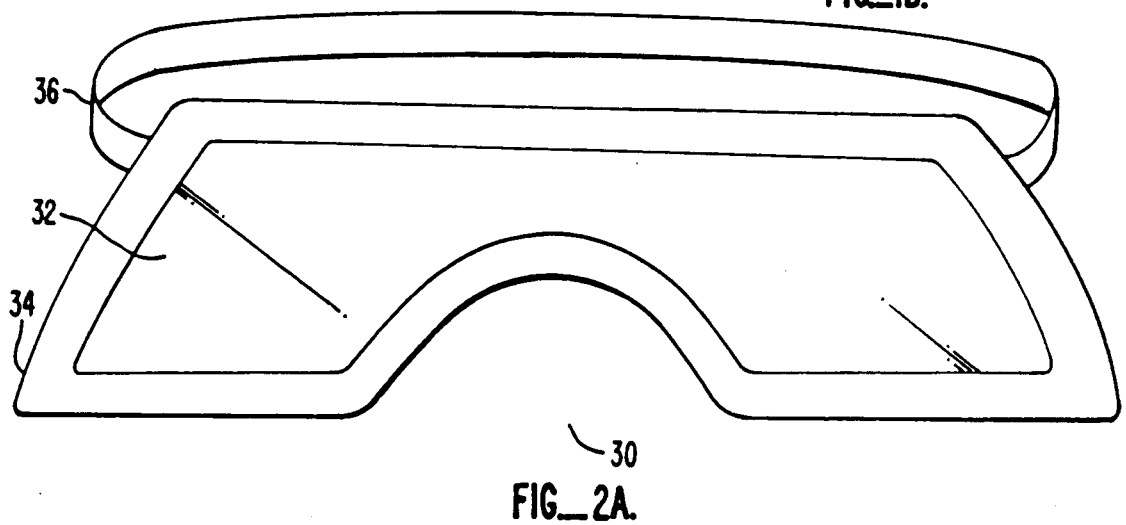
FIG._2A.
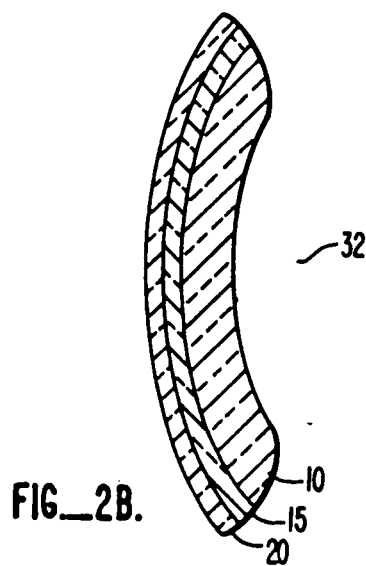
FIG._2B.

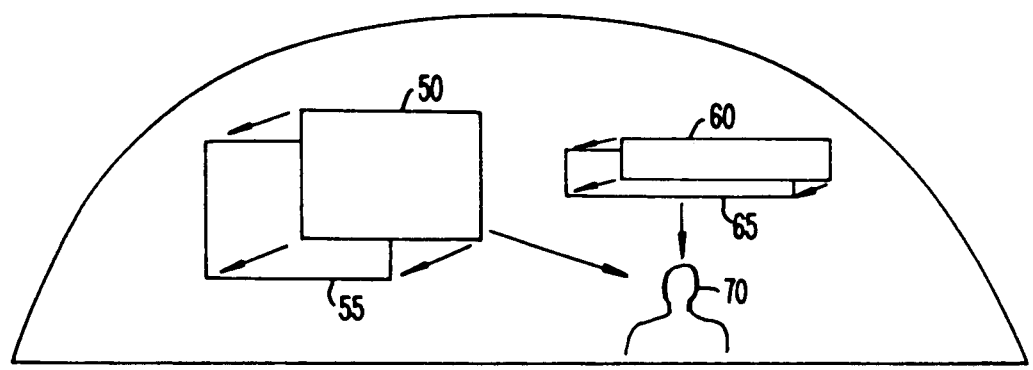
FIG._3.
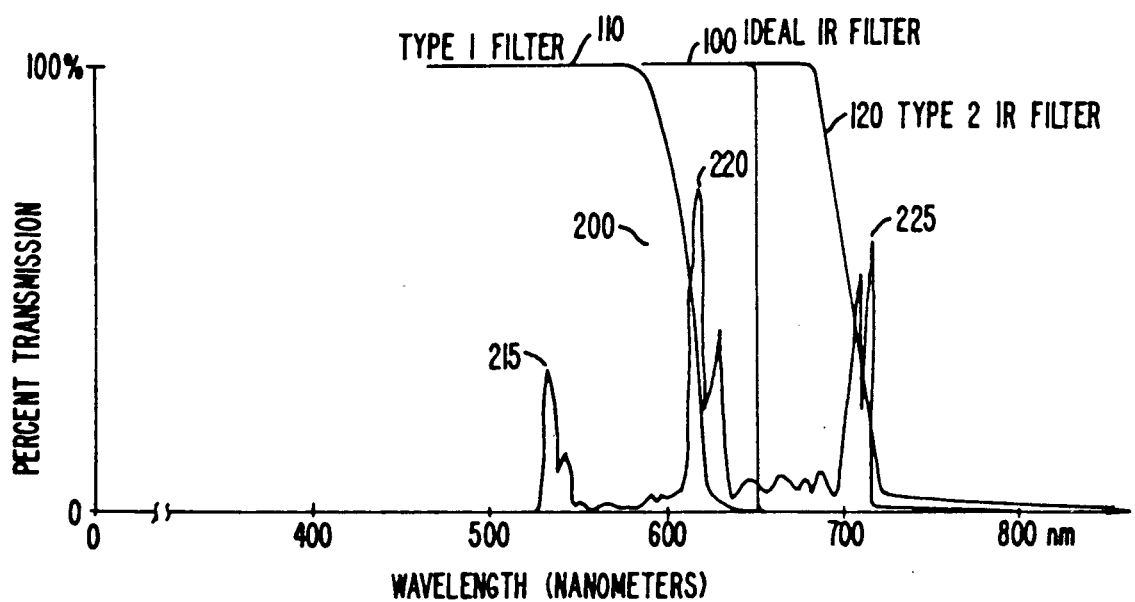
FIG._4.

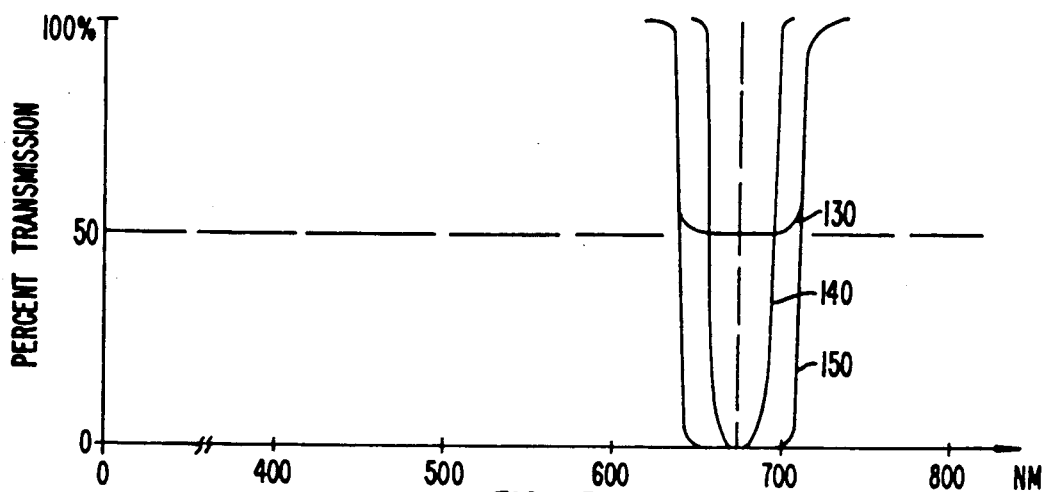
FIG._5.
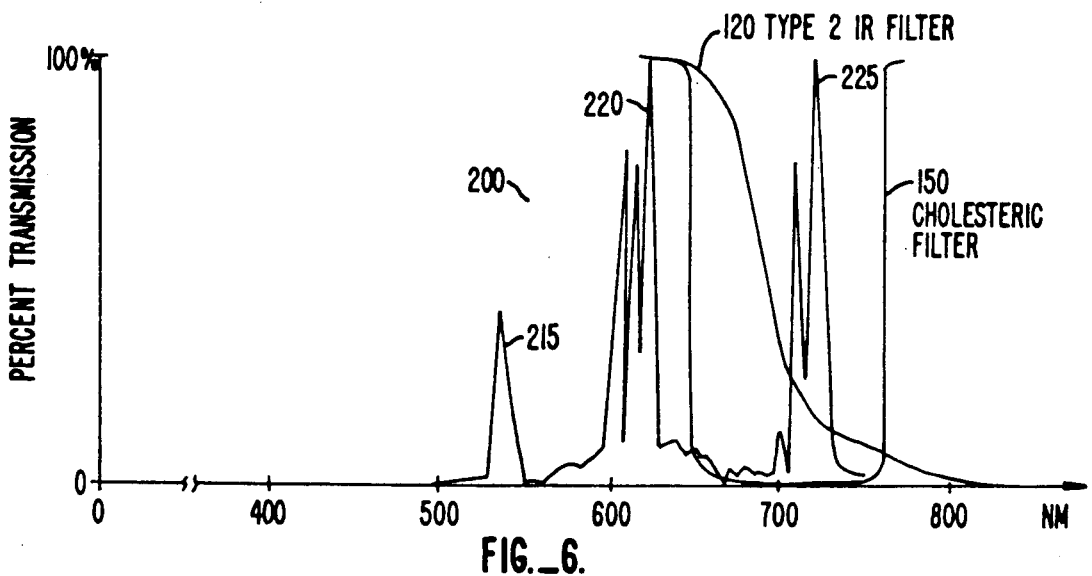
FIG._6.
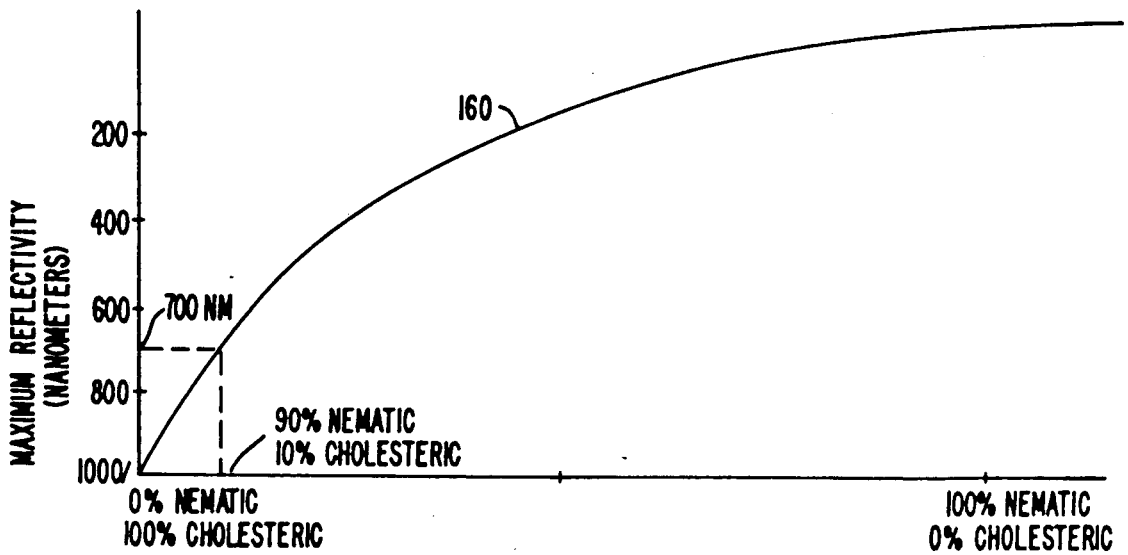
FIG._7.

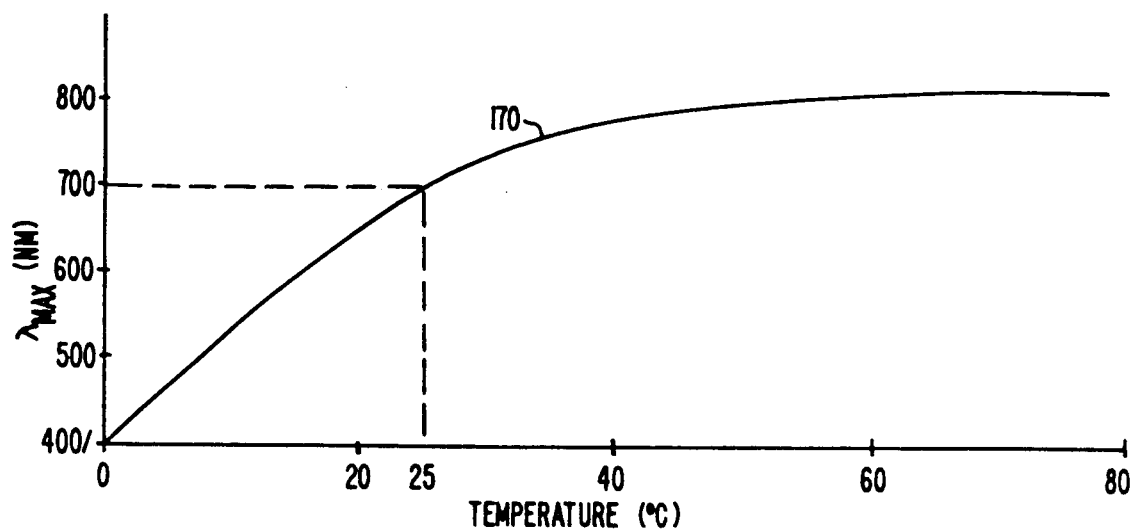
FIG._8.
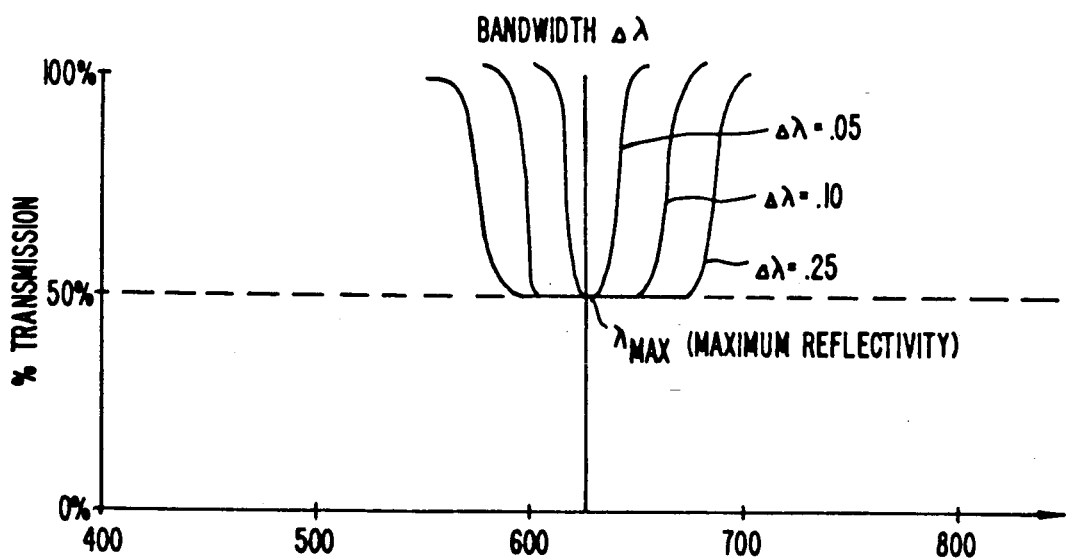
FIG._9.

INFRARED FILTER USING CHOLESTERIC LIQUIDS

BACKGROUND OF THE INVENTION

This invention relates to an optical filter system and more particularly to a sharp transition, high precision cholesteric liquid crystal combination filter for blocking the transmission of spurious, nearly visible infrared emissions in a night vision system.

It is well known that a pilot in an attack aircraft uses night vision goggles that permit the pilot to see infrared radiation from targets or other objects outside the aircraft.

Unfortunately, useful equipment within the cockpit may emit spurious infrared light at levels significant enough to cause problems for the pilot. For example, displays located in the cockpit area for generating red colored symbology also emit spurious infrared light at levels high enough to blind the pilot's night vision goggles to low level infrared sources of interest. In many cases the spurious infrared light has a wavelength that is almost in the visible region. Thus, it is highly desirable in night vision applications to provide a simple means for blocking spurious, nearly visible infrared emissions while permitting the maximum transmission of visible light at adjacent wavelengths.

Conventional infrared filters are known which block the transmission of light at infrared wavelengths. However, these filters lack the sharp transmission step characteristic needed to block transmission of nearly visible infrared light while also permitting maximum transmission of all visible light up to the infrared range.

Conventional head-up displays, night vision systems, and known optical devices do not teach or suggest any arrangement for achieving such a sharp transition high precision filter.

For example, Jacobs, et al. U.S. Pat. No. 4,679,911, teaches the use of cholesteric liquid crystal materials to shape the profile of an optical beam, e.g., a laser. U.S. Pat. No. 4,679,910 to Afron, et al teaches conversion of visible images to infrared using liquid crystal light valves, U.S. Pat. No. 4,423,927 to Bly describes a bandpass filter using twisted nematic liquid crystal devices having different time responses and opposite rotary direction handedness. U.S. Pat. No. 4,394,069 to Kay describes a liquid crystal tuned filter using zero-twist liquid crystal cells to obtain a narrow band transmission characteristic. U.S. Pat. Nos. 4,232,948 and 4,416,514, although pertaining to optical systems, do not teach or suggest any optical filter system capable of transmitting light up to an abrupt wavelength.

It is known that cholesteric liquid crystal optical filters are capable of transmitting light at substantially all wavelengths while reflecting light over a single, generally narrow, wavelength band. For example, U.S. Pat. No. 3,679,290 to Adams et al discusses the use of a matched pair of cholesteric liquid crystal elements to form an optical notch filter. The notch filter consists of one element that reflects right-hand circularly polarized light near a given wavelength and transmits left-hand circularly polarized light, and a second film that reflects left-hand circularly polarized light wavelength and transmits right-hand circularly polarized light. The two elements are arranged in series such that the filter effectively transmits all incident light with the exception of the wavelength band centered around that nominal wavelength. See also, U.S. Pat. No. 3,711,181 to Adams et al.

It is also known that the unique optical properties of cholesteric liquid crystal elements can be exploited to provide a wide variety of narrow band filtering functions extending over a wide wavelength range from the near ultraviolet to the far infrared. For example, an article by Adams, et al entitled "Cholesteric Films as Optical Filters," *Journal of Applied Physics,* Vol. 42, No. 10, September 1971, discloses several cholesteric element configurations which provide a notch filter function.

Although the foregoing Adams references discuss the general properties of cholesteric liquid crystal filters, these references are largely theoretical in nature and do not teach or suggest the use of the discussed cholesteric liquid crystal filters in sophisticated, practical applications.

Moreover, it is known that liquid crystal filters suffer from a number of limitations. First, it is known that the performance of cholesteric liquid crystal filters drifts over temperature. Therefore, if two elements are matched at one temperature, they may drift apart in performance at another temperature. Moreover, cholesteric liquid crystal filters have been previously used in essentially narrow band filtering applications.

Thus, although the use of cholesteric liquid crystal filters is known, the use of these filters in high precision, night vision, or in wideband filtering applications is neither taught nor suggested by the art.

SUMMARY OF THE INVENTION

The invention provides a high precision optical filter system for use in night vision display applications. In particular, the invention provides a precision optical filter for blocking infrared radiation while transmitting visible light. The optical filter is mechanically simple and easy to fabricate.

The optical filter comprises an infrared absorptive filter and a cholesteric liquid crystal filter which are used in combination for blocking transmission of light at infrared wavelengths while transmitting visible light up to a precisely defined wavelength. The infrared absorptive filter blocks infrared light over a wideband beginning at a first nearly visible corner wavelength. The cholesteric liquid crystal filter blocks transmission of infrared wavelengths in a precise narrow band that includes the nearly visible corner wavelength. The cholesteric filter includes a combination of cholesteric and nematic liquid crystal material, with the amount and nature of the nematic component determining the bandwidth for the liquid crystal cholesteric filter and the precision of the combination optical filter.

In one embodiment, the liquid crystal filter includes polymer cholesteric films for maintaining stable performance characteristics over a wide operating temperature range.

The invention may be fabricated by depositing a matched pair of liquid crystal polymer cholesteric films on a glass infrared absorptive filter element.

In another embodiment, the combined optical filter may be included in an eyepiece. In another embodiment, the eyepiece may be mounted in a goggles frame to form a goggles assembly for use, for example, in night vision applications.

The filter may also be used as an adapter which is mounted, for example, on a display device to block the transmission of undesirable Wavelengths of light at the source.

The invention will be more fully understood and appreciated from the following detailed description of various embodiments and when read in conjunction with the accompanying drawings and claims.

BRIEF DESCRIPTION OF THE DRAWINGS

FIG. 1A is a cross-sectional view of an optical filter according to one embodiment of the invention.

FIG. 1B is a cross-sectional view of an optical filter according to another embodiment of the invention.

FIG. 2A is an illustration of a goggles assembly including an eyepiece according to the invention.

FIG. 2B is a cross-sectional view of an eyepiece according to one embodiment of the invention.

FIG. 3 is a pictorial illustration of a cockpit environment employing optical filters to block infrared emissions from a cathode display device according to the invention.

FIGS. 4-9 are graphs which illustrate the optical output of a display system and the performance and characteristics of various filters according to the prior art and the invention.

DETAILED DESCRIPTION OF THE PREFERRED EMBODIMENTS

The invention will now be described first by reference to specific embodiments and then by reference to graphs which illustrate the operation, characteristics, and performance of the invention.

Refer now to FIG. 1A, which discloses an optical filter according to the invention. The optical filter 2 includes an infrared absorptive filter element 10 and a cholesteric liquid crystal filter element 12. Although the invention is shown in FIG. 1A as including an infrared element 10 in combination with a cholesteric element 12, it should be understood that other filter elements may be substituted for the infrared element and combined with the cholesteric filter within the scope of the invention. The physical arrangement of the filter elements may be modified, for example as shown in FIG. 1B, within the scope of the invention.

Infrared filter element 10 may be made, for example, of glass, and may be a CM 500 infrared absorptive filter, available commercially from Hoya, Inc. of Fremont, Calif.

The cholesteric liquid crystal filter 12 includes a first cholesteric liquid crystal element 15 and a second cholesteric liquid crystal element 20. Elements 15 and 20 are disposed on infrared filter element 10 in a series relationship. As an alternative, liquid crystal elements 15 and 20 may be disposed on opposing sides of infrared filter element 10, as shown in the embodiment of FIG. 1B. Films 15 and 20 are matched pairs of cholesteric films that reflect left and right handed circularly polarized light respective, over a precise bandwidth.

As further shown in FIGS. 1A and 1B, panchromatic light from a source (not shown) impinges optical filter 2 during use of filter 2. The light includes visible light and infrared light, and in particular includes nearly visible infrared light at a wavelength $\lambda_o$.

Infrared filter element 10 blocks transmission of light over most of the infrared spectrum and begins to block transmission of infrared light at a corner wavelength slightly above $\lambda_o$. "Corner wavelength" as used herein means a wavelength at which an optical filter begins to block transmission of light.

The cholesteric liquid crystal element 15 is left-hand circularly polarized and reflects left-hand circularly polarized infrared light in a defined band that includes wavelength $\lambda_o$.

Cholesteric element 20 is right-hand circularly polarized and reflects infrared radiation of right-hand circular polarity in the same band about wavelength $\lambda_o$.

The cholesteric films may be made for example of cholesteryl chloride (CC) and N-p-ethyotybenzlidene-p-n-butyl aniline (EBBA) liquid crystals. The CC is a cholesteric liquid crystal and the EBBA liquid is a nematic liquid crystal. The ratio of the CC to the EBBA may be 70:30 by weight.

The cholesteric elements are designed such that the reflective band about $\lambda_o$ has a bandwidth that does not extend into the visible region. Thus, the embodiments of the invention shown in FIGS. 1A and 1B transmit visible light but completely reflect infrared light according to the characteristics of infrared filter element 10 and the reflection characteristics of the cholesteric elements about wavelength $\lambda_o$.

Refer now to FIGS. 2A and 2B.

FIG. 2A shows a goggles assembly according to one embodiment of the invention. The goggles assembly 30 includes a frame 34, an eyepiece 32 and a band 36. The goggles assembly may be, for example, night vision goggles used to block visible light while transmitting infrared emissions. In this embodiment, eyepiece 32 includes a cholesteric liquid crystal filter in combination with a visible light filter element for blocking visible light and only transmitting light in the infrared region.

FIG. 2B shows an eyepiece 32 according to one embodiment of the invention. The eyepiece 32 includes an infrared filter element 10 which is composed of glass. The cholesteric elements 15 and 20 are deposited on infrared filter element 10 in series to form eyepiece 32.

It should be understood that eyepiece 32 may be formed as a lens element and thereby possess additional optical features.

Refer now to FIG. 3. FIG. 3 shows a cockpit 40 which includes a plurality of light emission sources 55 and 65. Light emission sources 55 and 65 may be, for example, display systems which provide visible red light output and spurious near visible infrared light output. A viewer 70 in cockpit 40 may wear special goggles that are designed to read data or symbology generated by displays 55 and 65 in cockpit 40. Unfortunately, spurious infrared light from sources 55 and 65 may provide a false reading or effectively blind viewer 70 to outside low level infrared sources. According to the invention, high precision optical filters 50 and 60 may be placed over sources 55 and 65, respectively, to block transmission of infrared wavelengths to viewer 70, thereby providing a cockpit having controlled infrared emissions.

The invention will now be further explained by reference to graphs which illustrate the optical output of a typical color display and the performance and characteristics of an optical filter system according to the invention.

Refer now to FIG. 4 which shows percent transmission versus wavelength curves 100, 110 and 120 for an ideal infrared filter, a type 1 infrared filter, and a type 2 infrared filter, respectively.

Also shown superimposed in FIG. 4 is a spectral output curve 200 for a display system which displays red symbology. As shown in FIG. 4, spectral output curve 200 includes a first peak 215 near 550 nanometers, a second peak 220 near 620 nanometers, and a third peak 225 near 700 nanometers. Peak 215 represents green light output, peak 220 represents the desired visible red light output, and peak 225 represents nearly visible infrared light output. Since peak 225 falls within the sensitivity range of typical conventional night vision goggles, this infrared output may blind or light up conventional night vision goggles. Thus, it is desirable to eliminate peak 225.

One way to reduce the transmission of the infrared light represented by peak 225 is to use a filter. An ideal filter for this application would transmit visible light up to the wavelength represented by peak 220 and would block transmission of the nearly visible infrared light at the wavelength represented by peak 225. Thus, the ideal filter would have a corner wavelength between peaks 220 and 225 and would have a transmissivity curve that transitions from just below 100% transmission at the corner wavelength to 0% transmission at peak 225. A performance curve 100 for such an ideal filter is shown in FIG. 4. Such a filter would completely eliminate the nearly visible infrared light and yet would not reduce the desired red light output from the display. Unfortunately, such an ideal filter is not obtainable in practice.

Performance curves 110 and 120, for type 1 and type 2 infrared filters respectively, are also pictured in FIG. 4. As shown by curve 110, the type 1 filter eliminates the nearly visible infrared peaks but has the undesirable side effect of greatly reducing the intensity of the red light output. As also shown by curve 120, the type 2 filter does not reduce the intensity of the red light in peak 220 but does not completely eliminate the undesirable infrared light represented by peak 225.

Refer now to FIG. 5. FIG. 5 is a graph which depicts the percent transmission versus wavelength for several cholesteric liquid crystal filters. Curve 130 represents the percentage transmission for a right (or matched left-handed) cholesteric liquid crystal filter. As shown in FIG. 5, curve 130 has a transmission minimum at wavelength $\lambda_o$. This minimum corresponds to 50% transmission, which indicates for a right-handed cholesteric filter that right-handed circularly polarized light will be reflected, and for a left-handed cholesteric filter that left-handed circularly polarized light will be reflected.

Curve 140 shows the performance for a matched pair of right and left-handed cholesteric liquid crystal filters in series. Curve 140 has a minimum transmissivity of 0 at frequency $\lambda_o$, which indicates that all light at this wavelength will be reflected by each pair of cholesteric filters. Curve 150 illustrates the percent transmission versus wavelength for another pair of matched right and left-handed cholesteric liquid crystal filters.

The curves in FIG. 5 illustrate the known propensity of cholesteric liquid crystal elements to reflect 100% of circularly polarized light of a given handedness near a nominal wavelength, and to transmit the other handed circularly polarized light without attenuation near that same wavelength. The cholesteric elements also have the useful property that their transmissivity curves could be expected to transition very rapidly from 100% transmission at a corner wavelength to their maximum reflectivity within a relatively short bandwidth.

It is also known that such liquid crystal notch filters may be made of a combination of cholesteric and nematic materials. One method for determining the bandwidth of maximum reflectivity is by controlling the amount of nematic material included in the liquid crystal filter. FIG. 7 is a graph which illustrates the relationship between percent nematic and cholesteric composition and the wavelength of maximum reflectivity ($\lambda_o$).

FIG. 5 also illustrates, as shown by curves 140 and 150, that differing bandwidths can be achieved for the cholesteric liquid crystal filter elements according to the following formula:

$$\text{DELTA}/\lambda_o = \text{DELTA N}/N$$

where

DELTA $\lambda$ is the bandwidth,

N is the average index of refraction of the liquid crystal film.

DELTA N is the average birefringence of the liquid crystal film, and $\lambda_o$ is the wavelength chosen for maximum reflectivity.

A typical value of N is 1.5. Delta N is typically in the range of 0.05 to 0.25. Therefore, at a wavelength of maximum reflectivity of 700 nanometers, the bandwidth could vary between 23 nanometers and 117 nanometers for these sample values of DELTA N and $\lambda_O$. DELTA N may be varied by varying the proportion of nematic material included with the cholesteric material in the liquid crystal film.

Refer now to FIG. 6. FIG. 6 is a graph showing the spectral output of the red, color display system, the transmissivity curve 120 for a type 2 infrared filter, and the transmissivity curve 150 for a cholesteric filter superimposed thereon according to the invention. As shown in FIG. 6, the transmissivity curve 120 for the type 2 filter transmits all visible light and blocks light at infrared wavelengths except for the nearby visible wavelength represented by peak 225.

According to one particular embodiment of the invention, a cholesteric filter is used in combination with a type 2 filter. The type 2 filter blocks infrared light except for infrared in the light range around visible and peak 225. The cholesteric filter is designed to have a maximum reflectivity around the wavelength represented by peak 225, i.e., near 700 nanometers. The cholesteric filter substantially blocks all wavelengths in the band roughly from 660 nanometers up to approximately 740 nanometers, i.e., over an 80-nanometer bandwidth. The cholesteric filter transmits light at all other wavelengths outside this band essentially unattenuated. Thus, the combination filter provides a wideband filter having a precision not heretofore available.

Refer now to FIG. 9. FIG. 9 is a graph depicting transmissivity curves for a number of liquid crystal filters having a number of bandwidths as determined by various of DELTA N values (i.e., birefringence values). Transmissivity curve 180 is for a DELTA N of 0.5, transmissivity curve 190 represents a DELTA N of 0.10, and transmissivity curve 195 is for a DELTA N of 0.25. As DELTA N increases the bandwidth increases, as is clearly shown in FIG. 9.

One limitation of conventional cholesteric liquid crystal filter elements is the tendency for the wavelength of maximum reflectivity ($\lambda$) to shift with temperature. FIG. 8 is a graph which depicts the wavelength of maximum reflectivity, $\lambda_o$, versus temperature. As can be seen from FIG. 8, as temperature increases, the wavelength of maximum reflectivity for a given cholesteric liquid crystal filter decreases.

One reason for this unwanted shift in $\lambda_o$ is the changing fluid properties of the cholesteric liquid crystal filter over temperature. According to one embodiment of the invention, a polymeric cholesteric liquid crystal as described in U.S. Pat. No. 4,637,896 by Shannon, may be used to stabilize the wavelength of maximum reflectivity over temperature.

According to another embodiment of the invention, another solution for resolving the problem of the shift in $\lambda_o$ for the liquid crystal filter is to make the bandwidth as wide as possible while making sure that the bandwidth does not overlap any wavelength for which transmission is desired as the bandwidth shifts over temperature. According to another embodiment, $\lambda_o$ may be shifted away from the spurious wavelength by design to compensate for anticipated shifts in $\lambda_o$ caused by operating temperatures.

It should be understood that the invention has been described in detail with respect to various specific embodiments. It should be recognized, however, that the invention is not limited to the embodiments or applications described herein, but rather that modifications, variations, and other applications can be made in practice which ere within the scope of the invention. For example, some color displays also output an infrared spike which is far out in the infrared region, far past the nearly visible infrared peak. Known filters for removing this far out peak would also greatly reduce the entire range of infrared input. It is possible according to the invention to overlay a cholesteric liquid crystal filter over a visible light filter or use a single cholesteric liquid crystal filter element for blocking this far out wavelength without degrading the overall sensitivity of the night vision goggles. Thus, according to the invention, it may be desirable to employ single or multiple cholesteric liquid crystal filters, either alone or in combination with other filter elements, as part of an eyepiece for night vision applications.

It is also within the scope of the invention for the wavelength of maximum reflectivity of the cholesteric filter to be located either at, above, or below a corner wavelength of a companion filter element within the scope of the invention depending on design considerations, choice of materials, sensitivity of the bandwidth to shifting temperature, or the precision of the filter companion.

In some applications, the use of a single cholesteric film (rather than a matched pair) in combination with a conventional wideband filter element may be adequate for providing the required filtering precision i.e., transition from transmission to nontransmission.

In other applications, a single film or multiple cholesteric liquid crystal films may be deposited on a lens or other conventional eyepiece to form an eyepiece having high precision optical filtering characteristics within the scope of the invention.

Accordingly, it should be understood that the invention is limited only by the appended claims.

What is claimed is:

1. A high precision wideband optical filter system comprising:
   a wideband optical filter having a corner wavelength; and
   a cholesteric liquid crystal notch filter, said notch including said corner wavelength.

2. The optical filter of claim 1 and wherein said liquid crystal filter comprises at least two films disposed on said wideband filter.

3. The filter of claim 1 and wherein said liquid crystal filter contains cholesteric and nematic liquid crystals in a ratio of approximately 70:30 by weight.

4. The filter of claim 1 and wherein said cholesteric liquid crystal filter includes a nematic material for substantially determining the width of said notch.

5. The filter of claim 1 wherein said notch filter further comprises:
   a first cholesteric liquid crystal having a reflective band for reflecting right-handed circularly polarized incident radiation; and
   a second cholesteric liquid crystal having a reflective band for reflecting left-handed circularly polarized incident radiation, each liquid crystal having its respective reflective band substantially centered on said corner wavelength.

6. An infrared optical filter comprising:
   an infrared filter for blocking transmission of light over a wide infrared band, said infrared filter having a nearly visible corner wavelength; and
   a cholesteric liquid crystal filter for blocking transmission of infrared light in a narrow band, said narrow band including said corner wavelength.

7. The filter of claim 1, 2 or 6, and wherein said liquid crystal filter includes a polymer for maintaining the maximum reflectivity of said filter near a constant wavelength over an operating temperature range.

8. The filter of claim 6 and wherein said liquid crystal filter includes an amount of nematic material chosen to maximize the reflectivity of said cholesteric filter substantially at said corner wavelength.

9. The filter of claim 6 and wherein said cholesteric filter comprises two polymer films deposited on said infrared filter.

10. A night vision goggles assembly comprising:
    a goggles frame; and
    an eyepiece mounted in said frame, said eyepiece including a visible light filter element and a cholesteric liquid crystal filter element disposed on said visible light filter element.

11. An eyepiece including:
    a supporting optical element forming a wideband filter element;
    at least two cholesteric liquid crystal films, forming a notch filter, disposed on the supporting optical element.

12. A high precision, wideband optical filter system for filtering radiation from a source emitting both visible and infrared radiation, the infrared radiation including a near visible infrared radiation peak, comprising:
    a wideband, infrared filter having a corner wavelength between a maximum visible radiation peak from the source and the near infrared peak; and
    notch filter means, including a cholesteric filter element, having a notch which includes said corner wavelength.

13. A method of blocking the transmission of infrared light while transmitting visible light including the steps of:
    providing a first infrared filter element:
    blocking infrared radiation above a nearly visible infrared corner wavelength with said first infrared filter element;
    providing a second cholesteric liquid crystal filter element; and
    blocking infrared radiation in a band including said nearly visible corner wavelength using said cholesteric liquid crystal element.

* * * * *

UNITED STATES PATENT AND TRADEMARK OFFICE
CERTIFICATE OF CORRECTION

PATENT NO. : 5,016,985
DATED : May 21, 1991
INVENTOR(S) : Kalmanash et al.

It is certified that error appears in the above-identified patent and that said Letters Patent is hereby corrected as shown below:

In column 6, line 9, delete "DELTA/$\lambda_o$" and substitute therefor, --DELTA$\lambda/\lambda_o$--.

In column 7, line 22, delete "ere" and substitute therefor, --are--.

Signed and Sealed this

Nineteenth Day of January, 1993

Attest:

DOUGLAS B. COMER

Attesting Officer

Acting Commissioner of Patents and Trademarks